United States Patent [19]

Gelderman

[11] Patent Number: 6,065,394
[45] Date of Patent: May 23, 2000

[54] EASILY CLEANABLE FOLDING PAN

[76] Inventor: John F. Gelderman, 1812 Valley Curve, Mendota Heights, Minn. 55118

[21] Appl. No.: 09/263,125

[22] Filed: Mar. 5, 1999

[51] Int. Cl.[7] .............................. A47J 37/00; A47J 37/04; A47J 37/12; A47J 43/00; A47J 43/18

[52] U.S. Cl. .............................. 99/449; 99/424; 99/426; 99/450

[58] Field of Search ............................. 99/339, 340, 400, 99/401, 422–425, 426, 427, 447–450; 126/390, 25 R, 369, 41 R; 220/661, 663, 912, 4.22

[56] References Cited

U.S. PATENT DOCUMENTS

| | | |
|---|---|---|
| 386,599 | 7/1888 | Neville . |
| 411,619 | 9/1889 | Shaeffer . |
| 559,037 | 4/1896 | McCleary . |
| 581,232 | 4/1897 | Hollandt . |
| 1,020,004 | 3/1912 | Wishman . |
| 1,107,987 | 8/1914 | Nash . |
| 1,292,476 | 1/1919 | Kavanaugh . |
| 1,830,230 | 11/1931 | Gwyer ................................ 99/449 X |
| 1,879,268 | 9/1932 | Hurst . |
| 1,945,013 | 1/1934 | Wilson . |
| 2,502,818 | 4/1950 | Bocchino ............................ 99/449 X |
| 2,503,795 | 4/1950 | Brown ................................ 99/449 X |
| 2,520,389 | 8/1950 | Ferris ................................. 99/449 X |
| 2,780,163 | 2/1957 | Lee . |
| 3,075,798 | 1/1963 | Smith ................................. 99/449 X |
| 4,223,818 | 9/1980 | Johnson .............................. 99/449 X |
| 4,393,857 | 7/1983 | Sanford .................................. 126/9 R |
| 4,884,499 | 12/1989 | Rensch et al. ........................ 99/450 X |
| 5,465,654 | 11/1995 | Lampi et al. . |
| 5,490,452 | 2/1996 | Schlosser et al. ........................ 99/422 |
| 5,503,062 | 4/1996 | Buff, IV ............................. 220/912 X |
| 5,560,286 | 10/1996 | Fabrikant et al. ....................... 99/426 |
| 5,768,980 | 6/1998 | Degen .................................. 99/450 X |
| 5,774,209 | 7/1998 | Tiemann .................................. 99/426 |

*Primary Examiner*—Timothy Simone
*Attorney, Agent, or Firm*—Litman, Kraai & Brown L.L.C.

[57] ABSTRACT

An improved, easily cleanable folding pan with a continuous cooking surface includes a pair of pan sections with generally planar cooking surfaces joined at the perimeter in side-by-side relationship by a pair of upstanding hinges. The hinges permit pivotal movement of the pan sections from a generally flat cooking position into a folded position for cleaning or storage. The fold margin of one of the pan sections slightly overlaps the fold margin of the other cooking surface, so that in the cooking position the pan presents a continuous cooking surface. The fold margin of one of the cooking surfaces may include a dependent lip for overlapping the fold margin of the other cooking surface when the pan is in the cooking position. A pair of opposed, upstanding handles may be coupled with the perimeter margin of the cooking surface. The perimeter margin of the pan section may be surmounted by an upstanding sidewall. The sidewall may, in turn, be surmounted by an outstanding rim supporting the hinges in raised, parallel relationship to the cooking surface. The pan sections may also be equipped with wells, perforations or slots.

16 Claims, 2 Drawing Sheets

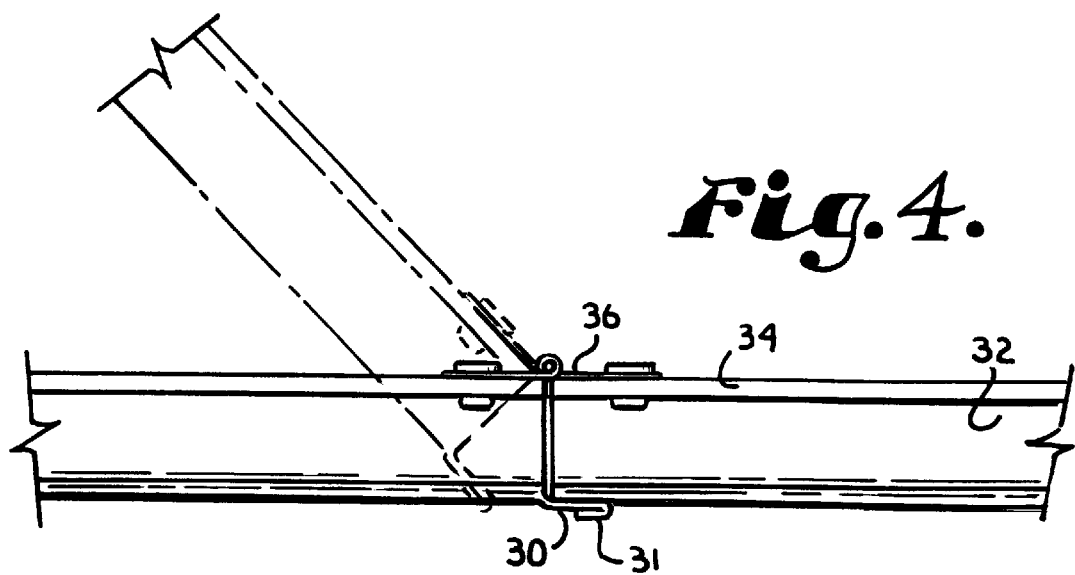
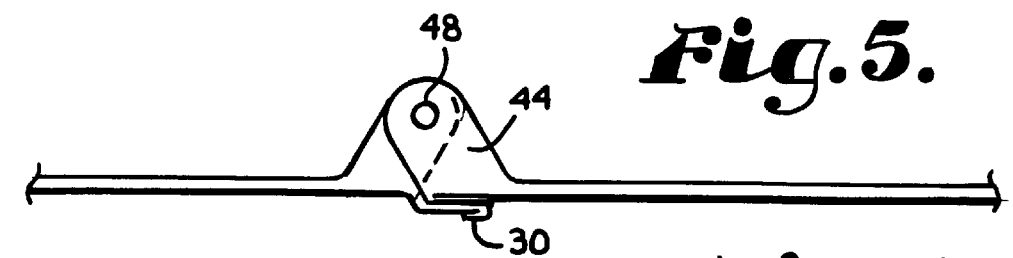
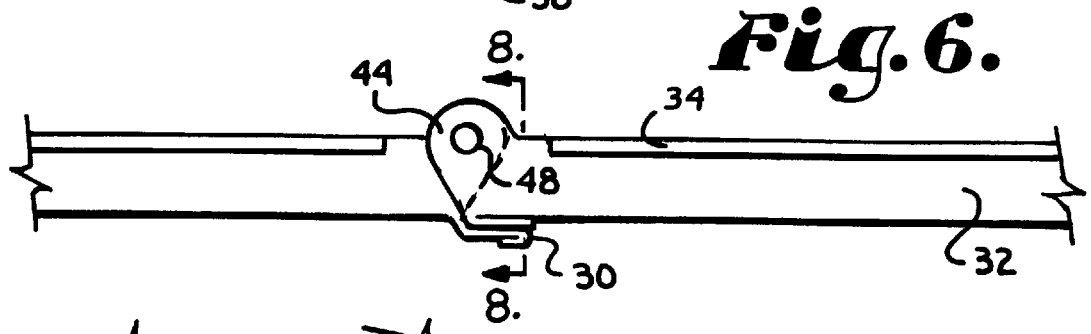
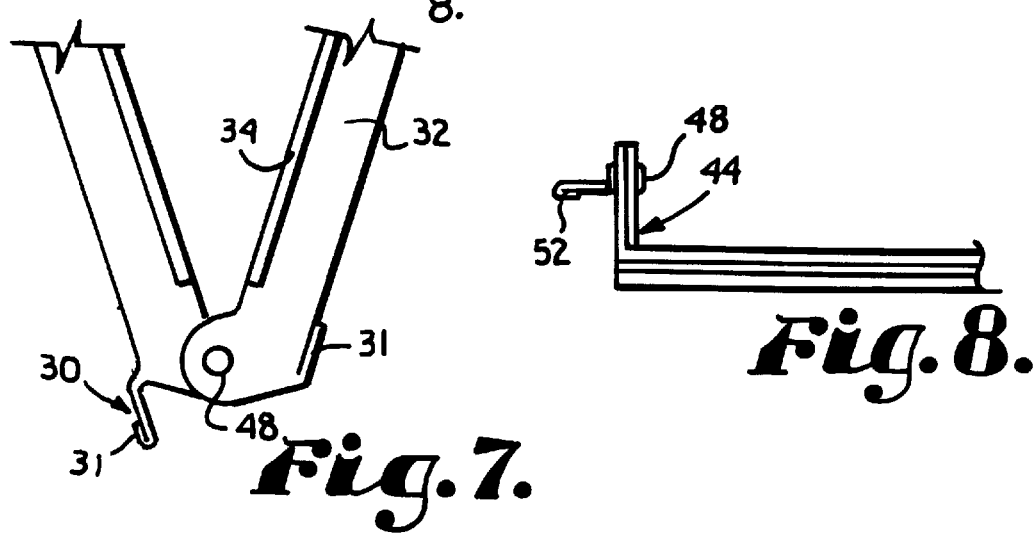
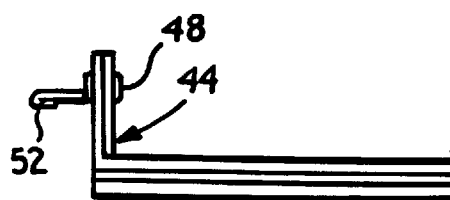

EASILY CLEANABLE FOLDING PAN

BACKGROUND OF THE INVENTION

1. Field of the Invention

The present invention is broadly concerned with an improved articulated pan specifically designed to provide a continuous central cooking surface while permitting the pan to be folded for easy cleaning and storage. More particularly, it is concerned with a pan having a pair of overlapping cooking surfaces joined by a pair of opposed, upstanding perimeter hinges. In one preferred embodiment, the outer perimeter of the pan includes an upstanding sidewall. In another embodiment, the sidewall is surmounted by an outstanding rim. The cooking surfaces may also include baking wells, perforations or slots.

2. Description of the Related Art

A fully equipped home kitchen invariably includes at least one pan or grill that must be washed by hand because it will not fit into a domestic dishwasher. Improvements in the palatability of frozen pizza and the recent availability of box mixes and ready made crusts have made pizza a staple item on the American dinner menu. All but the smallest of these require a pan having dimensions which exceed the capacity of standard domestic dishwashing equipment. Other common kitchen equipment such as cookie sheets, sheet cake pans and broiler grills are also generally too large for the dishwasher. Such items present kitchen storage problems as well. In many household kitchens, at least one cabinet is devoted to the transverse storage of such pans, which are too large to lie flat or to stand on end.

A number of hinged pans have been proposed in the past. For example, U.S. Pat. No. 386,599, issued to Neville, discloses a folding omelet pan having an upstanding central divider which is hinged to allow one half to be flipped over the other to complete an omelet.

U.S. Pat. No. 411,619 issued to Shaeffer discloses a cake griddle having a flat side and a welled side coupled by center hinges. Batter is poured into the wells on one side of the pan, cooked, and then the side is folded over the flat griddle side to complete the cooking.

U.S. Pat. No. 599,037 issued to McCleary discloses a griddle having a flat side and a welled side coupled by center hinges. Batter is poured into wells on a first side, cooked, and then the first side is folded over the flat griddle side to complete the cooking.

U.S. Pat. No. 581,232 issued to Holland discloses a baking pan or griddle with a bottom half hinged to a cover so that the cover can be folded over the bottom half.

U.S. Pat. No. 1,020,004 issued to Wishman discloses a bread pan with a bottom half hinged to a cover so that the cover can be folded over the bottom half.

U.S. Pat. No. 1,107,987 issued to Nash discloses a griddle having a pair of flat griddle sections surmounted by a bead or rim and coupled by hinges so that one side can be flipped over the other. Batter cooked on one half can be flipped over to the other half to complete cooking.

U.S. Pat. No. 1,292,476 issued to Kavanaugh discloses a folding omelet pan which is hinged in the middle to allow one half to be flipped over the other to complete an omelet. The pan has side walls between the halves.

U.S. Pat. No. 1,879,268 issued to Hurst discloses a pie pan with halves which are separable to allow the crust to be removed intact. During baking, the halves are locked together by swiveling locking members.

U.S. Pat. No. 1,945,013 issued to Wilson discloses a pie plate having semi-circular halves, each surrounded by an upstanding rim. The halves are hinged together so that one can be folded over the other to act as a lid in holding one half of a round pie.

U.S. Pat. No. 1,780,163 issued to Lee discloses a pie mold with two halves coupled by a central hinge to mold a semi-circular fruit pie as one half is folded over the other.

U.S. Pat. No. 5,465,654 issued to Lampe et al. discloses a pan with a bottom half and a hinged top lid. The pan is used for baking, frying, etc. in a convection oven.

These pans generally include a central hinge on the cooking surface itself or a hinged, upstanding divider which bisects the cooking surface, thus reducing the size of the available cooking surface by half. Moreover, pans with hinges on the cooking surface itself present substantial food removal and cleaning problems.

Accordingly, there is a need for an improved folding pan which provides a continuous cooking surface by permitting one side to partially overlap the other, while permitting the pan to be folded in the middle for easy dishwashing and storage.

SUMMARY OF THE INVENTION

The present invention overcomes the problems previously outlined and provides a greatly improved folding pan which is easy to clean with conventional dishwashing equipment, folds flat for storage, and is specifically designed to provide a centrally overlapped, continuous cooking surface. Broadly speaking, the folding pan includes a pair of pan sections with generalloy planar cooking surfaces joined at the perimeter in side-by-side relationship by a pair of upstanding hinges. The hinges permit pivotal movement of the cooking surfaces from a generally flat cooking position into a folded position for cleaning or storage. The fold margin of one of the cooking surfaces slightly overlaps the fold margin of the other cooking surface, so that in the cooking position the pan presents a continuous cooking surface. The fold margin of one of the cooking surfaces may include a dependent lip for overlapping the fold margin of the other cooking surface when the pan is in the cooking position. A pair of opposed, upstanding handles may be coupled with the perimeter margin of the cooking surface. The pan sections may also be equipped with wells, perforations or slots.

OBJECTS AND ADVANTAGES OF THE INVENTION

The principal objects and advantages of the present invention include: providing a pan which may be folded in half to fit inside a conventional household dishwasher for easy cleaning; providing a pan which may be folded to fit inside conventional household kitchen cabinetry for easy storage; providing a foldable pan in which the cooking surfaces are joined at the perimeter by a pair of upstanding hinges; providing a foldable pan in which portions of the cooking surfaces overlap to form a single large cooking surface; providing such a pan which has a cooking surface uninterrupted by hinges; providing such a pan in which the hinges are elevated above the cooking surface; providing such a pan in which the hinges are elevated above the cooking surface in generally parallel relationship; providing such a pan which may be used as a grill; providing such a pan which is slotted; providing such a pan which may be used as a pizza or other baking pan; providing such a pan which is perforated; providing such a pan which may be used as a cookie sheet; providing such a pan which does not include a sidewall or rim; providing such a pan which may be used as a baking or roasting pan; providing such a pan which includes a circumscribing sidewall; providing such a pan which may be used as a cupcake pan; providing such a pan which includes individual cooking wells; and providing such a pan which is simple, efficient and economical to manufacture, which effectively folds to a smaller size, and which is particularly well-adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary perspective view of a folding flat cookie sheet in accordance with the invention.

FIG. 4 is a fragmentary side view of the pan shown in FIG. 1, depicting a partially folded position in phantom.

FIG. 5 is a fragmentary side view of the flat cookie of FIG. 3.

FIG. 6 is a fragmentary side view of the pan of FIG. 2 having a sidewall and rim and illustrating an overlapping lip.

FIG. 7 is a fragmentary side view of the embodiment depicted in FIG. 6, showing the pan in a folded position.

FIG. 8 is a fragmentary cross section taken along line 8B8 of FIG. 6, illustrating a hinge.

DETAILED DESCRIPTION OF THE INVENTION

Figure 1:
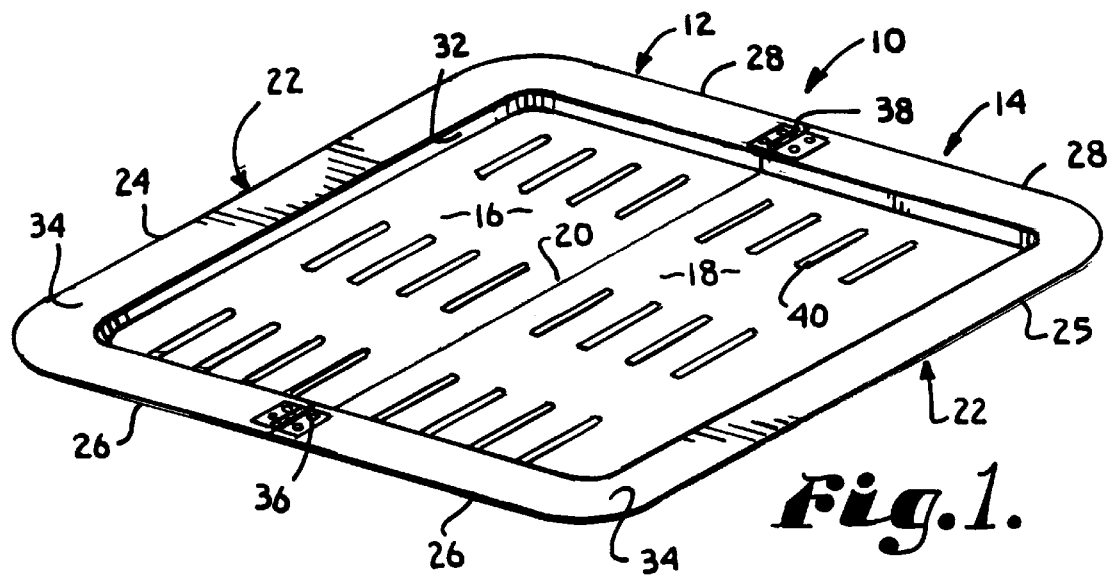
FIG. 1 is a perspective view of a folding broiler pan in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawing, a folding pan 10 in accordance with the invention is used for preparing and serving food. The pan 10 broadly includes first and second sections 12,14, having respective cooking surfaces 16, 18. Each surface 16, 18 presents a fold margin 20 and a perimeter margin 22. The perimeter margin 22 includes a pair of side margins 24, 25 and a pair of end margins 26, 28. As best shown in FIG. 4, one of the fold margins 20 is provided with an extended lip 30, which may be indented in order to depend slightly below the other margin 20 to facilitate overlap. The fold margins 20 and lip 30 may be provided with rolled edges 31. Each perimeter margin 22 is surmounted by a generally an upstanding continuous sidewall 32. The sidewalls 32 are each surmounted by a generally outstanding rim 34. A pair of hinges 36, 38 are mounted atop the rim 34 and adjacent the fold margins 20 for intercoupling the pan sections 12, 14 in raised, generally parallel relationship with the cooking surface.

Figure 2:
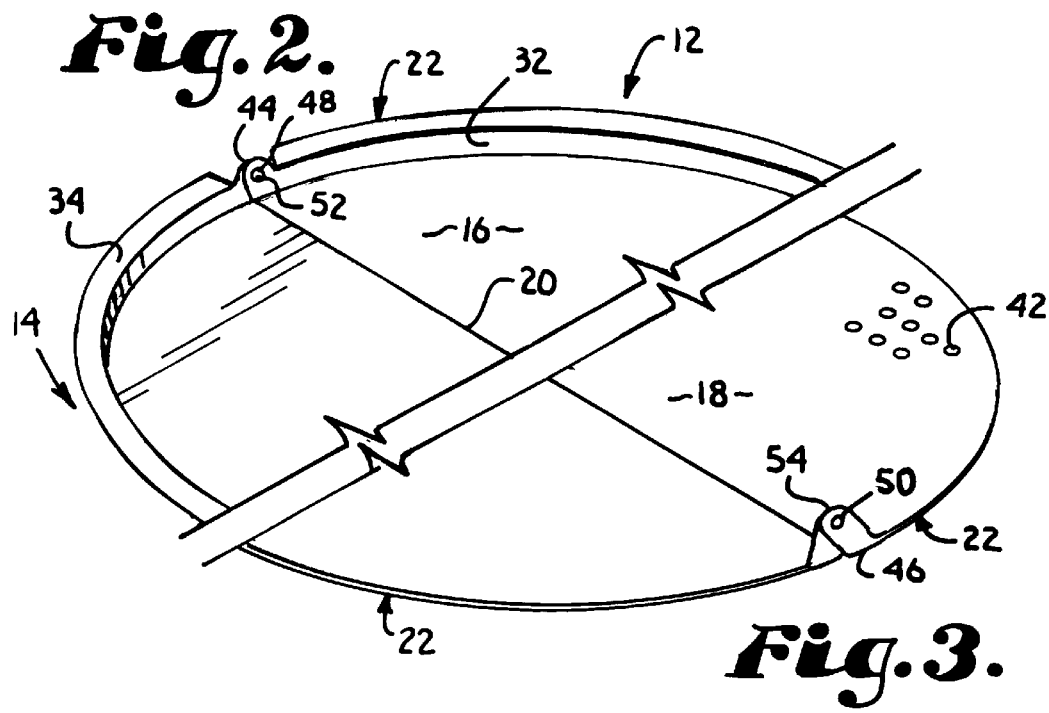
FIG. 2 is a fragmentary perspective view of a folding pizza pan in accordance with the invention, illustrating an upstanding sidewall surmounted by a hinge and a discontinuous rim.

The pan 10 may be generally square or rectangular in shape, as depicted in FIG. 1, generally circular as depicted in FIGS. 2 and 3, or it may be of any other suitable shape. The cooking surfaces 16, 18 may be of generally planar construction or they may be corrugated for use as a broiling pan. In addition, the surfaces 16, 18 may include elongate slots 40 to permit drippings to fall into a pan below or apertures 42, to permit steam to escape. The surfaces 16, 18 may also be constructed to include cooking wells (not shown) for preparing muffins, pancakes or the like. The drawing figures illustrate pans having two identically-shaped cooking surfaces. However, those skilled in the art will appreciate that three or more cooking surfaces may be coupled together so long as the fold margins are of compatible shape, and that the overall shape of each cooking surface may vary, as would occur for example, in a three part, heart-shaped pan.

The pan 10 may be constructed of aluminum, cast iron, stainless steel, copper, tin, or any other suitable metal or synthetic resinous material. The pan 10 may also be coated with a so-called "non-stick" polymer resin composition in order to facilitate cleaning.

In another embodiment of a pizza pan depicted in FIGS. 2, 6 and 7, the rim 34 stops short of the fold margin. The sidewalls 32 are each surmounted by a pair of opposed upstanding hinges 44, 46 adjacent the fold margin 20 for coupling the pan sections 12, 14 in the same manner as previously described.

Figure 9:
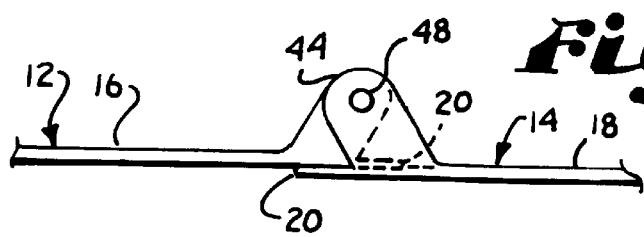
FIG. 9 is a fragmentary side view of an alternative embodiment of the cookie sheet, showing the cooking surface fold margins in overlapping relationship without a dependent lip.

In another embodiment depicted in FIG. 9, the pan is not equipped with a lip 30. The hinges 44 are constructed so as to permit overlap of one fold margin 20 over the other to provide a continuous cooking surface.

In an embodiment depicted in FIG. 3 and adapted for use as a baking sheet for cookies and the like, the pan lacks both sidewalls 32 and rim 34 so that the cooking surface perimeter margin 22 serves as the outer edge of the pan. The pan sections 12, 14 are intercoupled by means of upstanding hinges 44, 46 adjacent the fold margin 20 and equipped with pins 52, 54. In certain preferred forms, the cooking surface perimeter margins 22 may each be equipped with a short section of upstanding sidewall 32 which is angled outwardly to form a handle (not shown) for grasping the pan 10.

In use, the pan 10 may be folded by a user from a first, substantially flat cooking position, into a second, folded position for cleaning and storage. In the first, cooking position, the cooking surfaces 16, 18 lie side-by-side in substantially the same plane with one of the fold margins 20 abutting the other fold margin 20. In preferred embodiments, the hinges 36, 38 are constructed so as to permit one of the fold margins 20 to overlap the other fold margin. Where a lip 30 is present, the lip 30 overlies the other fold margin 20, in this manner, the surfaces 16, 18 collectively form a single cooking surface which is uninterrupted by any upstanding structural element, such as a sidewall or hinge. Such a continuous cooking surface is particularly well-adapted for preparing items such as pizza, cookies, sheet cakes, jelly rolls or casseroles. In the second, cleaning and storage position the cooking surfaces 16, 18 are rotated about the hinges 36, 38 or 44, 46 into a facing position. The surfaces 16, 18 may be rotated into a semi-folded position, for example, for placement within a dishwasher in a tented position in order to achieve maximum exposure to spray from the washer jets. Alternatively, the surfaces 16, 18 may be rotated into a completely folded position for dishwashing or flat storage.

Advantageously, the previously described construction permits fabrication of large pans for household consumer use. Because pans of such construction may be folded in half, the size of the pan that can be washed in a household dishwasher is effectively doubled. When in the cooking position, even such large pans permit usage of the entire cooking surface at once. Such pans are particularly easy to clean, because the elevated hinges are not fouled by food on the cooking surface.

It is to be understood that while certain forms of the present invention have been illustrated and described herein, it is not to be limited to the specific forms or arrangement of parts described and shown.

What is claimed and desired to be secured by Letters Patent is as follows:

1. A foldable pan, comprising:
   a. a first pan section with a generally planar cooking surface and a second pan section with a generally planar cooking surface, each of said pan sections having a perimeter margin and a fold margin; and
   b. a pair of opposed, upstanding hinges coupling together said first and second pan sections, each of said hinges extending upward from the perimeter margins of both pan sections adjacent the fold margins thereof to allow said first and second pan sections to be pivoted between a cooking position in which their cooking surfaces are generally coplanar with each other and a folded position in which their perimeter margins are converged toward each other.

2. The foldable pan of claim 1, wherein the fold margin of said first pan section overlaps the fold margin of said second pan section when said pan sections are pivoted to said cooking position.

3. The foldable pan of claim 2, wherein the fold margin of said first pan section further includes a lip for overlapping the fold margin of said second pan section when said pan sections are in said cooking position.

4. The foldable pan of claim 1, wherein each pan section further includes a cooking well.

5. The foldable pan of claim 1, wherein each said pan section further includes spaced apertures for permitting drainage of liquids away from said cooking surfaces.

6. The foldable pan of claim 1, further including a handle coupled with a portion of one of said pan section perimeter margins.

7. A foldable pan, comprising:
   a. a first pan section with a generally planar cooking surface and a second pan section with a generally planar cooking surface, each of said pan sections having a perimeter margin and a fold margin;
   b. an upstanding sidewall coupled with each pan section perimeter margin;
   b. a pair of opposed, upstanding hinges coupling together said first and second pan sections, each of said hinges extending upward from the uppermost portion of the perimeter margins of both pan sections adjacent the fold margins thereof to allow said first and second pan sections to be pivoted between a cooking position in which their cooking surfaces are generally coplanar with each other and a folded position in which their perimeter margins are converged toward each other.

8. The foldable pan of claim 7, wherein the fold margin of said first pan section overlaps the fold margin of said second pan section when said pan sections are pivoted to said cooking position.

9. The foldable pan of claim 8, wherein the fold margin of said first pan section further includes a lip for overlapping the fold margin of said second pan section when said pan sections are in said cooking position.

10. The foldable pan of claim 7, wherein each pan section further includes a cooking well.

11. The foldable pan of claim 7, wherein each said pan section further includes spaced apertures for permitting drainage of liquids away from said cooking surfaces.

12. A foldable pan, comprising:
    a. a first pan section with a generally planar cooking surface and a second pan section with a generally planar cooking surface, each of said pan sections having a perimeter margin and a fold margin;
    b. an upstanding sidewall coupled with each pan section perimeter margin;
    c. an outstanding rim coupled with the uppermost portion of each of said sidewalls;
    d. a pair of opposed, upstanding hinges coupling together said rims of said first and second pan sections adjacent the fold margins thereof to allow said first and second pan sections to be pivoted between a cooking position in which their cooking surfaces are generally coplanar with each other and a folded position in which their perimeter margins are converged toward each other.

13. The foldable pan of claim 12, wherein the fold margin of said first pan section overlaps the fold margin of said second pan section when said pan sections are pivoted to said cooking position.

14. The foldable pan of claim 13, wherein the fold margin of said first pan section further includes a lip for overlapping the fold margin of said second pan section when said pan sections are in said cooking position.

15. The foldable pan of claim 12, wherein each pan section further includes a cooking well.

16. The foldable pan of claim 12, wherein each said pan section further includes spaced apertures for permitting drainage of liquids away from said cooking surfaces.

* * * * *